Figure 1:
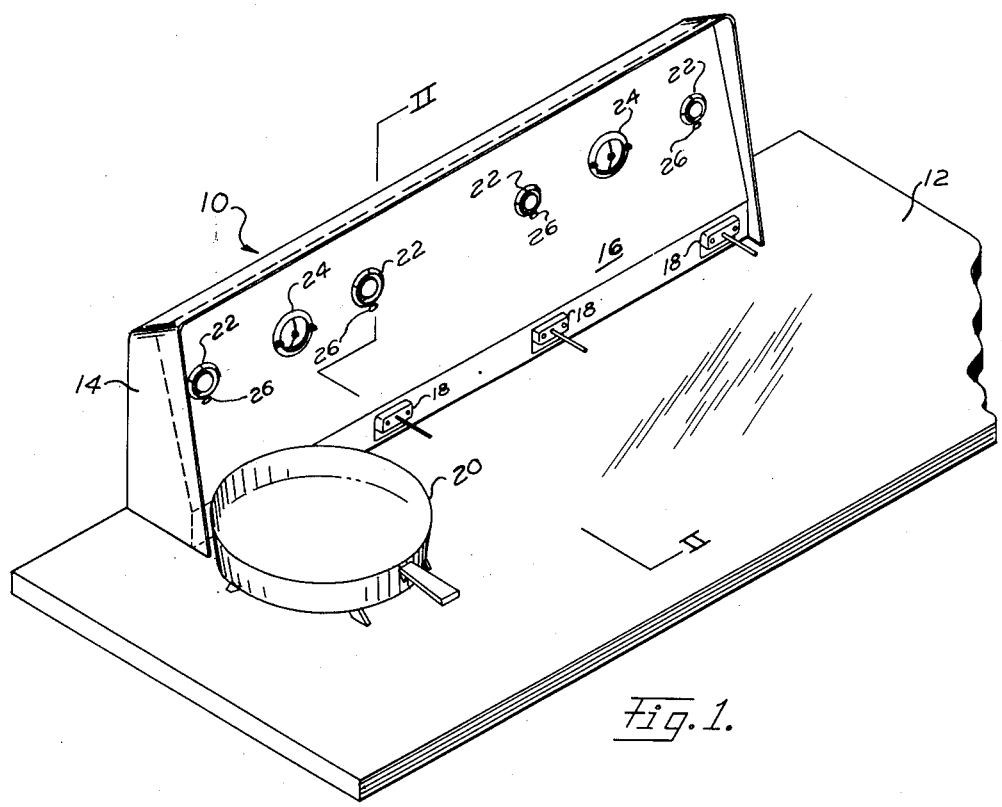

Sept. 25, 1962

C. HOLLERITH 3,056,013

COOKING APPLIANCE

Filed July 22, 1959

4 Sheets-Sheet 1

INVENTOR
CHARLES HOLLERITH

BY Beaman Beaman

ATTORNEY

Sept. 25, 1962

C. HOLLERITH 3,056,013

COOKING APPLIANCE

Filed July 22, 1959

4 Sheets-Sheet 2

INVENTOR
CHARLES HOLLERITH

BY Beaman & Beaman

ATTORNEY

Sept. 25, 1962     C. HOLLERITH     3,056,013
COOKING APPLIANCE

Filed July 22, 1959     4 Sheets-Sheet 3

INVENTOR
CHARLES HOLLERITH
BY Beaman Beaman
ATTORNEY

Sept. 25, 1962

C. HOLLERITH 3,056,013

COOKING APPLIANCE

Filed July 22, 1959

4 Sheets-Sheet 4

INVENTOR
CHARLES HOLLERITH

BY Beaman & Beaman

ATTORNEY 3,056,013
COOKING APPLIANCE
Charles Hollerith, 706 W. Michigan Ave.,
Jackson, Mich.
Filed July 22, 1959, Ser. No. 828,746
12 Claims. (Cl. 219—43)

The invention relates to an electric cooking control appliance and particularly pertains to a central cooking unit for use with utensils incorporating self-contained electric heating elements.

The use of cooking, baking and grilling appliances having a heating element cast or otherwise directly incorporated into the utensil has recently become widespread and the advantages of such utensils, namely the efficient, closely regulated, and even heat distribution over the cooking surface, make their use highly desirable. As it is the common practice with such utensils to employ an electrical cord of at least six feet in length and to place the utensil, during cooking, upon the kitchen counter, the cord usually lies in haphazard fashion on the counter. The cord thus becomes a nuisance and, more important, becomes a safety hazard as accidentally snagging the cord may pull the hot utensil from the counter. The above disadvantages caused by the cord are compounded wherein several such utensils are employed simultaneously on the same counter top.

Conventional self-contained heating element utensils use control thermostats which are either built into the utensil, usually the handle, or are located on one end of the cord and may be removed from the unit. The latter type is most desirable as the utensil may be completely immersed during the cleaning thereof. However, a thermostat affixed to the cord end is often subjected to considerable accidental abuse.

It is thus an object of the invention to provide a cooking control console unit for use with self-contained heating element utensils which eliminates the use of an electric cord and wherein the console contains the temperature regulation and thermostat apparatus.

Another object of the invention is to provide a central cooking unit for self-contained heating element utensils which may be easily installed on a counter top or other supporting member and yet requires very little space upon the counter top.

Yet another object of the invention is to provide a counter top cooking console of an attractive appearance which permits the utensils to be easily connected thereto and which may take several forms to provide different utensil arrangements.

Another object of the invention is to provide a cooking unit for use with self-contained heating element utensils wherein the thermostat and electrical connection unit is mounted within the cooking unit for limited pivotal movement thereto and may be advanced and retracted between accessible and concealed positions.

A further object of the invention is to provide a switch connection for self-contained heating element utensil wherein arcing at the contact members of the utensil and the connection is eliminated.

Figure 3:
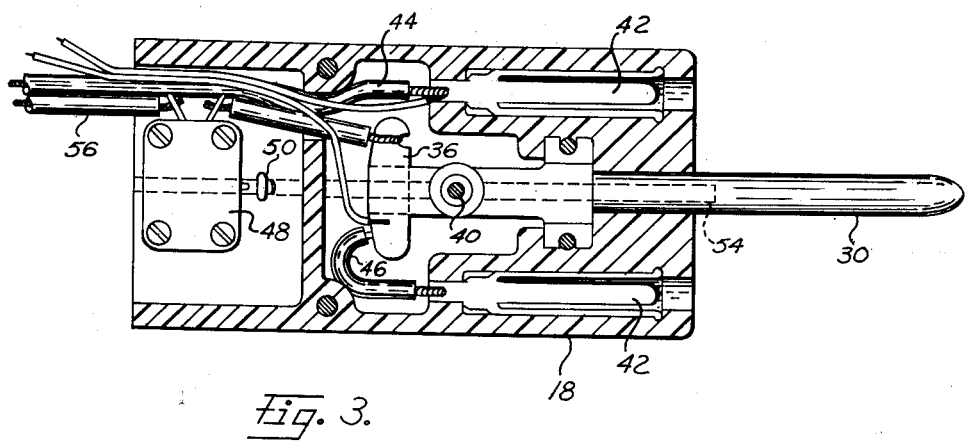
Figure 2:
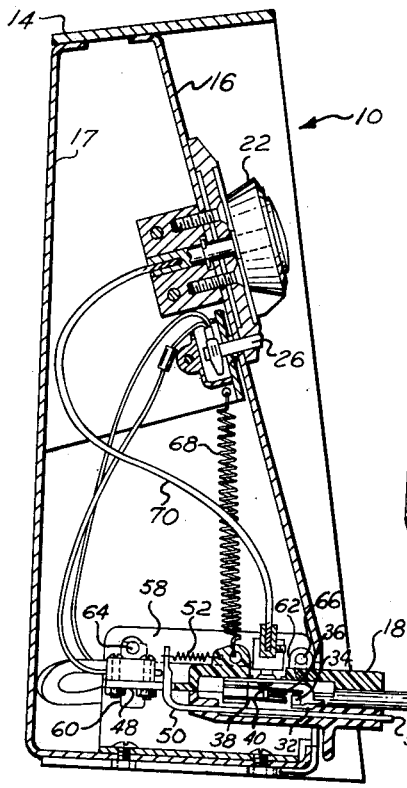
Figure 4:
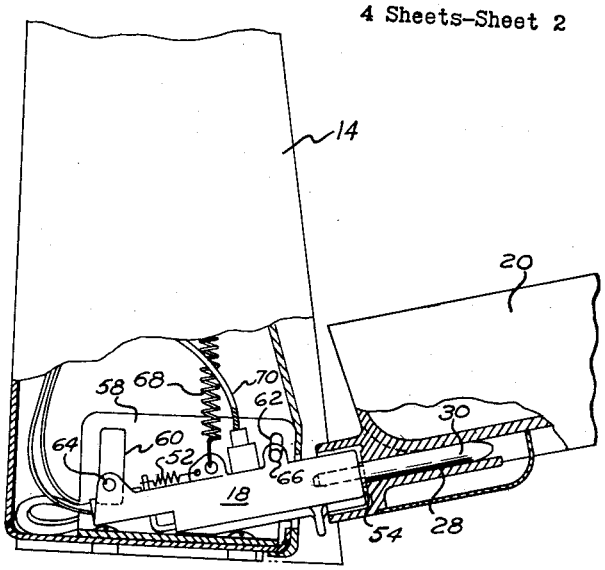
Figure 5:
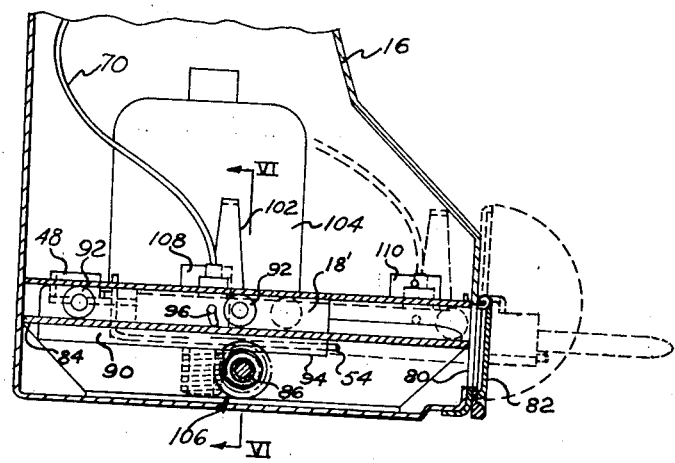
Figure 6:
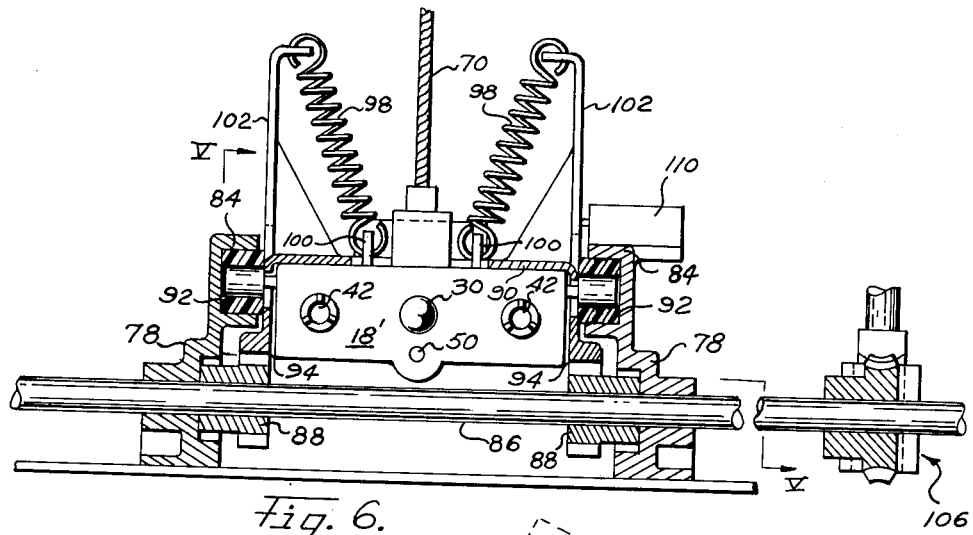
Figure 7:
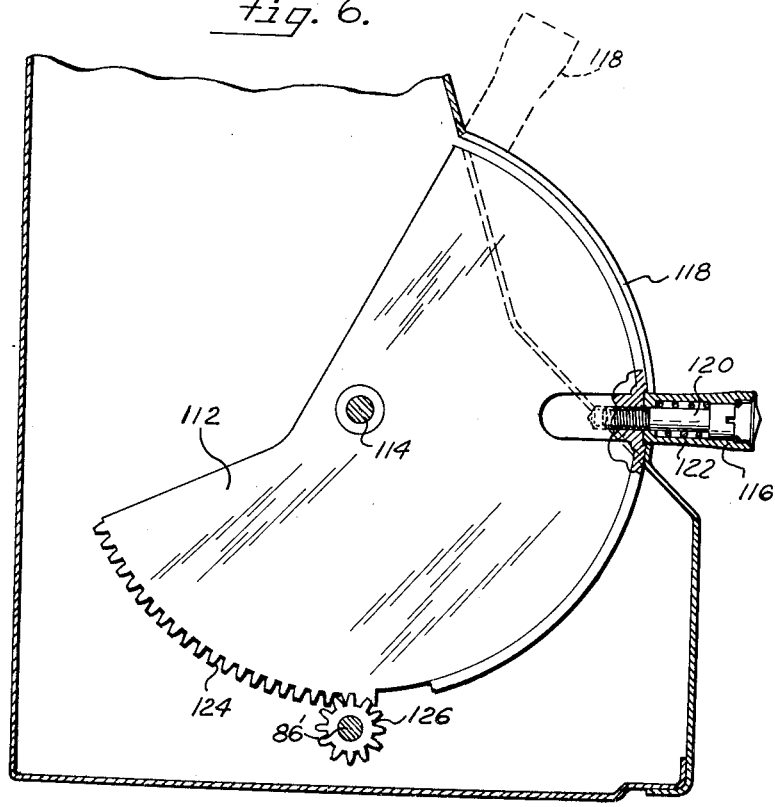
Figures 8, 9:
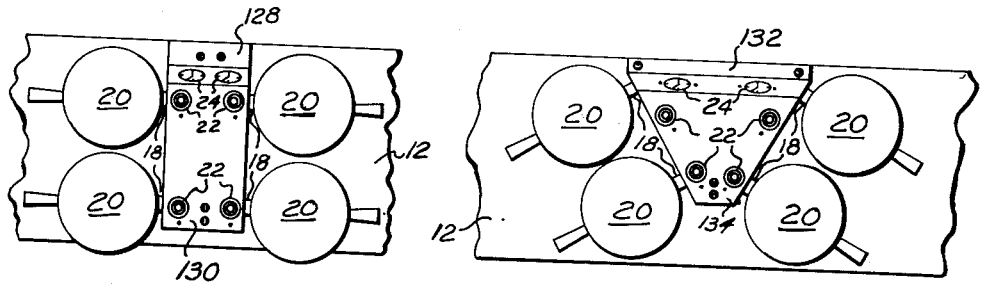
Figure 10:
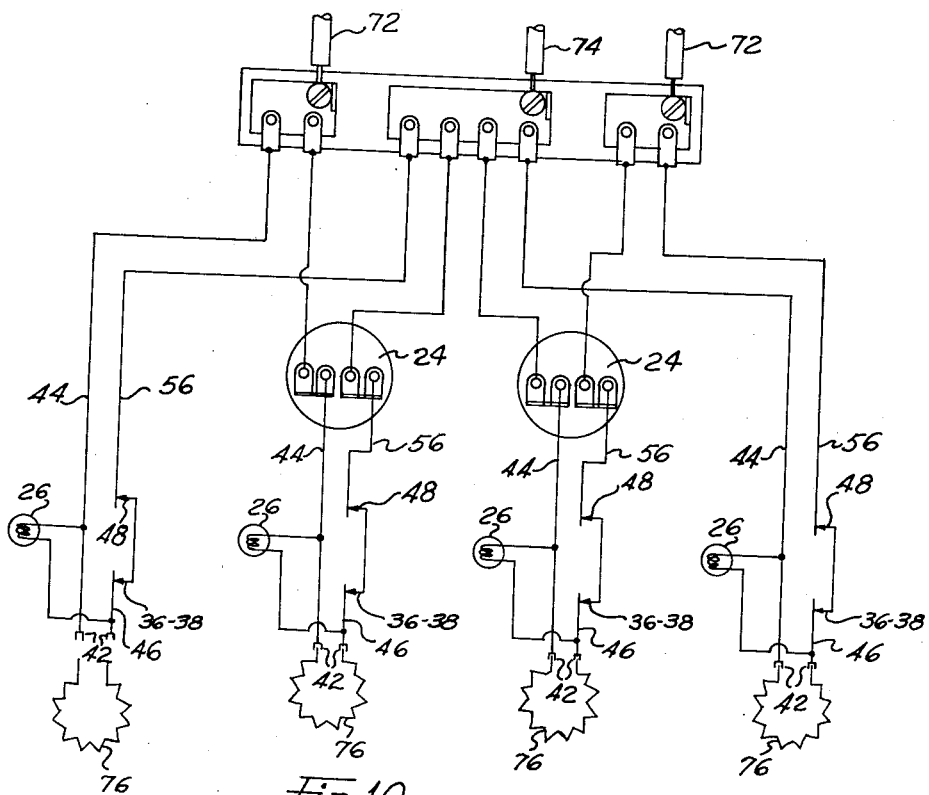

These and other objects of the invention will become apparent from the following description and accompanying drawings wherein:

FIG. 1 is a perspective view of the cooking console of the invention as mounted on a counter top with a utensil connected thereto, FIG. 2 is a cross sectional elevational view taken along line II—II of FIG. 1, FIG. 3 is a plan view of the electrical switch and thermostat unit with the top half thereof removed, FIG. 4 is an elevational, partially sectioned view of the switch and thermostat unit in situ and connected to a utensil which is being tilted for basting, FIG. 5 is an elevational sectional view of a modification of switch and thermostat unit mounting wherein the unit may be retracted into the housing of the cooking console, FIG. 6 is an elevational, sectional view of the embodiment of FIG. 5 taken along line VI—VI thereof showing only the guide element and carriage structure in section, FIG. 7 is an elevational, sectional view of a manual control for translating the thermostat unit between retracted and accessible positions, FIGS. 8 and 9 are plan views of various embodiments and arrangements the console may take and FIG. 10 is a view of the electrical circuit employed with a cooking console having four thermostat units.

The cooking console of the invention may be constructed to accommodate any number of utensils. However, a console which will permit a maximum simultaneous use of four utensils is preferable for domestic use and this particular embodiment is illustrated in the drawing.

Referring to FIG. 1, the cooking control console 10 is shown as mounted on a counter top or similar planar support 12. The console may, of course, take many forms and that illustrated consists of a housing defined by an inverted U-shaped bonnet 14 having a front panel 16 affixed thereto and preferably enclosed at the rear by a back panel 17. The console is of an elongated, narrow configuration wherein a relatively small portion of the rear counter top area is occupied by the unit and the use of the counter top is only slightly affected. A plurality of switch and thermostat units 18 are mounted in the lower region of the console 10 and project from the front panel 16 at a height which will align with the electrical and thermostat sockets of the utensil 20. A thermostat control knob 22, for each thermostat, is mounted on the front panel 16 at a conveniently accessible position and timer clocks 24 and pilot lights 26 are also included in the circuitry and are mounted on the panel. The interconnection and function between the members mounted on the front panel and other components of the invention are described hereinafter.

The utensils employed with the console are of the conventional type having self-contained heating elements cast or affixed to the cooking surface and have sockets 28, FIG. 4, formed therein to receive the thermostat probe and pin type terminals constitute the electrical connections. This construction is conventional and utensils of this type are in widespread use with thermostats which are mounted at the end of an electric cord. As a matter of convenience, utensils used with the console 10 should have their sockets located on the opposite side of the utensil to which the handle is affixed. FIG. 1 discloses a frying pan, as connected to the console. However, utensils of this type are also manufactured in the form of grills, casseroles, sauce pans and other shapes and it is intended that the console 10 be employed with all such utensils.

The internal structure is best illustrated in FIGS. 2 and 3 wherein the switch and thermostat unit 18 is shown in detail. The unit 18 is preferably constructed of a molded, non-electrical conducting material and includes top and bottom halves. A thermostat probe is mounted in the thermostat unit 18 and includes an outer casing 30 of a metal having a pre-determined thermal expansion and an internal strut 32 having different thermal expansion characteristics than the casing 30. The thermostat probe is received within the socket 28 of the utensil 20, FIG. 4, and hence the temperature of the utensil will be directly transferred to the probe. A switch contact engaging button 34 is mounted upon strut 32 and controls the position of the thermostat contact leaf 36. A second contact leaf 38 is mounted in the unit 18 below leaf 36 and the electrical contacts of leaves 36 and 38 will engage upon the need for heat as required. The strut 32 is mounted within casing 30 in such a manner that as the probe heats up during cooking, the difference of thermal expansion causes relative axial displacement between the strut and casing and vertically raises the button end of the strut. This movement raises the leaf 36 and will break the engagement between the contacts of leaves 36 and 38. The regulation of the contact leaf operation is achieved by a screw operated pin 40 which extends through a hole in the leaf 36 and bears on the leaf 38. By rotating the pin 40 the pin is axially translated and the distance between leaves 36 and 38 varied. It will thus be apparent that during cooking the contact leaf 36 will alternately "make and break" with leaf 38 and a substantially pre-determined temperature may be maintained by the utensil.

The above described probe, casing, strut and leaf construction is conventional and further description is believed unnecessary to understand this part of the invention.

A pair of electric control sockets 42 are also mounted within unit 18 to receive the terminal pins of the heating element of the cooking utensil 20. One of the sockets 42 is supplied by a conductor 44, while the other socket is connected by a conductor 46 to the leaf 38. The leaf 36 is connected to one terminal of a switch 48 for a purpose as will be hereinafter explained. The socket 20 of the utensil includes a pair of parallel spaced pin terminals, which are in circuit with the heating element and are on opposite sides of the probe receiving socket whereby inserting the probe within socket 20 also inserts the heating element terminal pins into sockets 42.

To prevent arcing between the element terminal pins and sockets 42 when the utensil is plugged or unplugged into unit 18, the switch 48 is employed in the heating element circuit. An actuator rod 50 is mounted in the unit 18 for axial movement thereto and the left end, FIG. 2, is bent upwardly and engages the contact operator of a switch 48. A spring 52 continually biases rod 50 to the right and the rod end 54 will normally project from unit 18 under the thermostatic probe. Upon completely inserting the socket 28 onto the probe, the portion of the utensil adjacent the probe will engage the rod end 54 and push rod 50 to the left to close switch 48. At this time the terminal pins will be well received within sockets 42 and arcing will be prevented. A conductor 56 connects the switch 48 to the voltage supply as will be explained in the discussion of FIG. 10. Upon unplugging the utensil from the unit 18, the initial movement of the utensil to the right permits switch 48 to open and arcing will also be prevented during disconnection.

It is desirable that the utensil be permitted a limited tilting action while connected to the thermostatic unit 18 for purposes of basting and the unit 18 is thus pivotally mounted within the console 10. The unit 18 is cradled between a pair of plates 58, one of which is shown in FIGS. 2 and 4, which extend parallel to the thermostatic probe. Vertical slots 60 and 62 are defined in each of the plates 58 and receive studs 64 and 66, respectively, which project from the sides of the unit 18. A spring 68 is affixed to an anchor on the top of unit 18 and to an anchor within the housing above the unit to exert a continuous upward pull on the unit 18 and maintain the studs against the upper ends of the slots 60 and 62. This relation is shown in FIG. 2 wherein the probe is maintained in a horizontal position. Upon raising the handle of the utensil, the utensil may be tilted as shown in FIG. 4, in which case the studs 64 will move downwardly in slots 60. Thus the stud and slot arrangement permit the unit 18 to be tilted but prevent movement of the unit in the direction parallel to the thermostat probe.

Referring to FIG. 2, it will be noted that the thermostat control knob 22 is connected to the regulating screw pin 40 by a flexible cable 70, and suitable indicia is associated with the control knob whereby a given temperature setting of the leaf contact 38 may be determined. The indicating light 26 is connected by conductors to one of the sockets 42 and the control leaf 38 to indicate when the utensil heating element is heating.

The electrical circuit employed with a four thermostat console, as in FIG. 1, is shown in FIG. 10. From this circuit it will be noted that the console is supplied by two 110 volt conductors 72 and a ground 74. The heating elements are represented at 76 and all of elements as shown as engaged with sockets 42 except the leftmost element, which is in the "unplugged" condition. It will be noted that the switches 36—38 and 48 are connected in series whereby both of the switches must be closed to complete the circuit to the heating elements. It is desirable to include a timer in the circuity of a pair of the thermostatic units 18 and thus the clocks 24 are of the type which will turn the circuit on or off at specified times. It will be appreciated that the illustrated circuit may be modified within the scope of the invention, for instance, the timer clocks need not be used on all models of consoles.

An embodiment of the invention is shown in FIGS. 5 and 6, wherein the thermostatic unit may be retracted within the console to obtain more usable counter space immediately adjacent the console. In this embodiment the thermostatic unit 18' is similar to that described above except for minor mounting variations which will be later apparent. In this embodiment a pair of longitudinal guide elements 78 are mounted within the console housing and extend at right angles to an opening 80 formed therein. A hinged door 82 normally covers the opening 80. Each of the guide elements 78 is provided with a U-sectioned track 84 and a shaft 86, extending the length of the console housing, is journaled within the guide elements and a gear 88 is affixed to the shaft adjacently below the track 84. A carriage 90, of generally inverted U configuration, is interposed between guide elements 78 and includes a pair of nylon rollers 92 on each side thereof which cooperate with the tracks 84 whereby the carriage 90 will easily roll the length of the guide elements. The carriage 90 is also formed with racks 94 which mesh with gears 88 such that positioning of the carriage is determined by the rotation of shaft 86.

The carriage 90 is provided with vertically disposed slots 96 for cooperation with studs projecting from the sides of the thermostatic unit 18' and springs 98 anchored at 100 to the unit 18' and at anchors 102 mounted upon carriage 90, bias the unit 18' upwardly, yet permit the unit to tilt for purposes of basting. As will be noted in FIG. 6 the anchors 100 project through openings within the carriage and the horizontal portion of the carriage limits upward movement of the thermostatic unit.

An electric motor 104, FIG. 5, mounted within the console housing, rotates shaft 86 through worm gearing 106 and thus moves the carriage and unit 18' toward or away from opening 80. Motor 106 is of the reversible type and limit switches 108 and 110 mounted on the guide elements and actuated by the carriage limit the movement of the carriage between fully retracted and extended positions. A control switch, not shown, is mounted on the console at a convenient location and the carriage 90 will be in the retracted full line position of FIG. 5 under normal non-use conditions. When it is desired to connect a utensil to the unit 18', the motor switch is activated to move the carriage and unit to the extended dotted line position of FIG. 5, wherein the probe will lift the door 82 and be in a position to receive the utensil socket 28. After cooking is completed the carriage may be retracted back into the console housing and the door 82 is balanced for automatic closure.

FIG. 7 illustrates an embodiment for rotating shaft 86 manually. In this construction a gear segment 112 is rotatably mounted within console 10 upon a shaft 114. A handle 116 is mounted on segment 112 and projects through a slot 118 formed in a bulbous section of the console housing to accommodate the gear segment. The handle 116 is axially movable on a screw 120 which threads into the segment and a spring 122 biases the handle inwardly for cooperation with enlarged portions of the slot 118 to lock the segment in a given rotative position. Upon pulling handle 116 outwardly, the segment may thus be rotated through the arc permitted by slot 118.

Gear teeth 124, formed on the gear segment, mesh with a pinion 126 fixed to shaft 86', thus, as the segment 112 is rotated, the shaft 86' will rotate and the carriage 90 may be retracted or extended manually. The carriage will be retracted when the components are as shown in the full lines of FIG. 7 and extended when the handle is moved to the dotted line position.

Modifications of console construction are illustrated in FIGS. 8 and 9. For instance, in the console of FIG. 8, an upright portion 128 mounts the timer clocks and a horizontal portion 130, which rests on the counter top 12 and extends almost the entire depth of the counter, houses the thermostatic probe units and the temperature regulating control knobs 22. This embodiment permits the utensil handle to project parallel to the counter top. However, more counter space is occupied by this console than that of FIG. 1.

The embodiment of FIG. 9 employs a vertical console portion 132 and a horizontal portion 134 in similar fashion to the console of FIG. 8. However, the sides of portion 132 converge to provide yet another utensil arrangement. While the console of the invention has been described as being mounted on a counter top, the console may be mounted on its own planar base whereby the console and base may be moved about as a unit, resulting in a portable cooking appliance.

From the above description it will be apparent that the console of the invention completely eliminates the need for electric cords with self-contained heating element utensils and provides an attractive cooking center that may be readily installed on a conventional counter top. The console greatly reduces the danger of accidentally tipping the utensil or pulling the utensil from the counter and by providing a protected and firm support for the thermostatic probe unit prevents the probe unit from being damaged.

It will be understood that various modifications to the invention other than those illustrated may be apparent to those skilled in the art and it is intended that the spirit and scope of the invention be limited only by the following claims.

I claim:

1. In a counter top control unit appliance for use with self-contained heating element utensils, in combination, an independent console housing defined by front, top and side portions adapted to be supported upon a planar surface, at least one thermostatic and electrical connection unit mounted within said housing and partially extending through the front portion thereof for direct access with the thermostatic and electrical connection of a utensil supported on said planar surface, said thermostatic and electrical connection unit including a body portion, a switch and a pair of electrical terminal members within said body portion, an elongated probe extending forwardly from said body portion to be received in a recess in the utensil and a temperature responsive element within the probe adapted to actuate said switch, at least one control means mounted on said housing vertically disposed above and remote from said connection unit and remote control means operatively associating said control means with said thermostatic and electrical connection unit for the control thereof.

2. In a control unit as in claim 1 wherein a plurality of thermostatic and electrical connection units are mounted within said housing and a plurality of control means are mounted on said housing, each of said control means being operatively associated with a unit by remote control means.

3. In a control unit as in claim 1 wherein said thermostatic and electrical connection unit includes a switch activated by the connection of the utensil structure to said unit, whereby the electrical terminal members of said thermostatic and electrical connection unit are not energized until complete engagement between said unit and utensil electrical connections is achieved.

4. In a control unit for use with self-contained heating element utensils, in combination, an independent console housing defined by front, top and side portions adapted to be supported upon a planar surface, at least one thermostatic and electrical connection unit mounted within said housing and partially extending through the front portion thereof for direct access with the thermostatic and electrical connection of a utensil supported on said planar surface, means pivotally mounting said thermostatic and electrical connection unit within said housing, at least one control means mounted on said housing vertically disposed above and remote from said connection unit and remote control means operatively associating said control means with said thermostatic and electrical connection unit for the control thereof.

5. In a control unit for use with self-contained heating element utensils, in combination, an independent console housing defined by front, top and side portions adapted to be supported upon a planar surface, at least one thermostatic and electrical connection unit mounted within said housing and partially extending through the front portion thereof for direct access with the thermostatic and electrical connection of a utensil supported on said planar surface, a pair of spaced parallel plates mounted within said housing, vertical slots defined in said plates, studs projecting from said thermostatic and electrical connection unit slidably received within said slots and spring means interposed between said housing and unit biasing said unit in an upward direction, at least one control means mounted on said housing vertically disposed above and remote from said connection unit and remote control means operatively associating said control means with said thermostatic and electrical connection unit for the control thereof.

6. In a control unit for use with self-contained heating element utensils, in combination, a housing defined by front, side and top portions adapted to be supported upon a planar surface, a thermostatic and electrical connection unit mounted within said housing adjacent said planar surface, means mounting said thermostatic unit for movement relative to said housing whereby said unit may be selectively retracted within said housing and moved to an accessible position through an opening defined in said housing adjacent said planar surface, control means mounted on said housing and means operatively associating said control means with said thermostatic and electrical connection unit for the control thereof.

7. In a control unit as in claim 6 wherein said means mounting said thermostatic and electrical connection unit comprises a pair of spaced, longitudinal guide elements having tracks defined thereon, a carriage mounted between said guide elements having rollers associated with said tracks, means mounting said thermostatic unit upon said carriage and drive means operatively associated with said carriage to selectively position said carriage upon said guide elements.

8. In a control unit as in claim 7 wherein said means mounting said thermostatic unit upon said carriage includes vertically disposed slots within said carriage, studs affixed to said unit movably received within said slots and spring means interposed between said unit and said carriage biasing said unit upwardly with respect to said carriage.

9. In a control unit as in claim 7 wherein said drive means includes a gear rack defined on said carriage, a shaft rotatably mounted in said housing, a gear fixed to said shaft meshing with said rack and motive means adapted to rotate said shaft.

10. In a control unit as in claim 9 wherein said motive means comprises a reversible electric motor.

11. In a control unit as in claim 9 wherein said motive means comprises a gear segment in mesh with a second gear fixed to said shaft and manually operable means affixed to said segment for manually rotating said segment.

12. A control unit for use with self-contained heating element utensils comprising, in combination, an independent console housing adapted to be supported upon a planar surface, thermostatic and electrical connection means mounted in said housing at a location directly engageable with the thermostatic and electrical connections of a utensil supported on said planar surface adjacent said housing, pivot means mounted within said housing pivotally supporting said thermostatic and electrical connection means relative to said housing, and control means mounted on said housing vertically disposed above and remote from said connection means and operatively associated by remote control means with said housing mounted thermostatic and electrical connection means for the regulation thereof.

References Cited in the file of this patent

UNITED STATES PATENTS

| | | |
|---|---|---|
| 1,686,347 | Scheuermann | Oct. 2, 1928 |
| 1,989,224 | Beltram | Jan. 29, 1935 |
| 2,196,842 | Strazzabosco | Apr. 9, 1940 |
| 2,293,764 | Roeder | Aug. 25, 1942 |
| 2,450,336 | Hall | Sept. 28, 1948 |
| 2,767,299 | Valentine | Oct. 16, 1956 |
| 2,799,847 | Harris | July 16, 1957 |
| 2,834,868 | Greene et al. | May 13, 1958 |
| 2,866,956 | Miller | Dec. 30, 1958 |
| 2,926,230 | Foster | Feb. 23, 1960 |
| 2,931,873 | Lang | Apr. 5, 1960 |

FOREIGN PATENTS

| | | |
|---|---|---|
| 1,175,766 | France | Nov. 17, 1958 |